Patented Aug. 1, 1939

2,167,762

UNITED STATES PATENT OFFICE 2,167,762

GETTER AND THE APPLICATION THEREOF

Lloyd D. Lockwood, Madison, N. J., assignor to Westinghouse Electric & Manufacturing Company, East Pittsburgh, Pa., a corporation of Pennsylvania No Drawing. Application November 7, 1936, Serial No. 109,762

19 Claims. (Cl. 176—2)

This invention relates to incandescent electric lamps and more particularly to a maintenance getter which will clean up carbon and carbon monoxide.

One of the objects of the present invention is the provision of a maintenance getter to replace that usually employed and thereby avoid certain difficulties arising in connection with factory operation.

Another object of my invention is the provision of a maintenance getter which is non-hygroscopic and has no water of crystallization.

A further object of my invention is the provision of a getter which will not etch the tungsten filament even if an excess stays in contact therewith.

A still further object of my invention is the provision of a maintenance getter having large and irregular crystal sizes so as to form a spongy mass on the bulb.

Other objects and advantages of my invention will become apparent as the description proceeds.

The development of the present invention occurred when searching for a getter for two distinct purposes: first, a material was desired which would clean up carbon and carbon monoxide as these two materials have been troublesome in connection with lamp manufacturing; second, a getter was desired which would give better maintenance than cryolite ($Na_3AlF_6$) and which could be used to replace sodium farric fluoride ($Na_3FeF_6$). Sodium ferric fluoride is an excellent maintenance getter but has three bad features which make its control difficult in factory operation. First, the material takes up water readily and so has to be handled in order to keep moisture away and all work must move fast through the factory. Any gettered material delayed during production has to be scrapped. Second, the preheat has to be controlled over very narrow limits, as just enough heat must be applied in order to remove the water of crystallization and to decompose about ten per cent of the getter material, but not enough to burn it. This heat is so high that the operators have burned fingers and the shrinkage on cracked bulbs and related items is apt to be large. If the preheat is not controlled over the required narrow range, excessive heat causes burning of the getter, while insufficient heat produces a lamp which is apparently good on initial test, but which gets very gassy and arcs after about twenty minutes burning.

Third, the getter must be applied evenly on the filament and flashed off fast, as a small lump left in one spot for a short period reacts with the tungsten and causes an etched spot, resulting in short life.

In accordance with my invention I propose to replace sodium ferric fluoride with a double fluoride including a metal of the alkali or alkaline earth group and a heavy element such as one of the group including uranium and thorium. This compound has been found to be preferably potassium uranium fluoride, ($KuF_5$) which is not hygroscopic, has no water of crystallization, and will not etch the tungsten filament, even if a particle does stay in contact therewith.

The improved form of getter may be used either alone, with phosphorus, or with other materials, excluding or including phosphorus, as desired.

One formula which has been found satisfactory is 94 parts of poassium uranium fluoride and 6 parts phosphorus. Another formula is 95 parts of potassium uranium fluoride and 5 parts of phosphorus. A satisfactory formula of the type, including materials other than phosphorus in order to make the getter flash more readily, may be made by mixing 48 parts of potassium uranium fluoride with 98 parts of barium fluoride ($BaF_2$), 21 parts of calcium fluoride ($CaF_2$), 21 parts magnesium fluoride ($MgF_2$), and 12 parts of phosphorus. If desired, however, the phosphorus may be omitted as well as certain other ingredients. For example, a satisfactory getter has been made by mixing 19 parts of potassium uranium fluoride with 1 part of phosphorus. Another formula for good results included 47 parts of potassium uranium fluoride and 3 parts of phosphorus.

The getter material may be applied in any one of the usual ways; that is, for example, as a suspension directly to the filament, or if employed with a coil filament, said getter may be applied dry directly within the coils, in accordance with the Gustin Patent 1,813,571 of July 7, 1931, owned by the assignee of the present application. Specific examples follow:

200 grams of the getter powder is milled with 150 to 190 cc. of a liquid composed of nitrocellulose, 200 seconds viscosity, dissolved in amyl or butyl acetate, thinned with amyl or isopropyl acetate. This milled mix is then put in a cup and the wire passed through it. After allowing to dry, the gettered wire is then passed through a binder cup which coats nitrocellulose over the getter to hold it on. The binder may be an amyl acetate suspension.

The milled mix, as above, may be further thinned for use with a spray gun; for example, with five parts ethyl acetate or with six parts methanol, ether, nitrocellulose mixture, and three parts nitrocellulose amyl acetate mixture. Either of the above mixtures may be sprayed on the coils as they are suspended by air pressure in a glass cylinder, for example. Another method includes placing the coils on a revolving plate and spraying them with any one of the above mixtures.

In accordance with the "dip" method, the whole mount of coil, leads, and supports, or sometimes just the coil, is dipped into the milled mix suspension. The lead tips, and sometimes the coil, may also be painted with the mixture by use of a small brush which dips into the getter and touches the lead tips at the required point.

The following tables show the results using my improved form of getter, compared with those attained in using a sodium ferric fluoride or "iron" getter.

| Type of getter | No. of lamps | Life at labeled voltage | Initial efficiency for designed life | Mean efficiency for designed life | Percent initial lumens at 1,000 hours |
|---|---|---|---|---|---|
| *Lamps designed for 2,000 hours* | | | | | |
| 18-4 | 5 | 1751 | 9.84 | | 72.1 |
| $KUF_5$-6 | 5 | 2617 | 10.39 | | 77.6 |
| 18-4 | 10 | 1874 | 9.99 | 7.65 | 70.1 |
| $KUF_5$-5 | 10 | 2249 | 10.05 | 7.94 | 74.7 |
| *Lamps designed for 1,000 hours* | | | | | |
| 18-4 | 30 | 1037 | 11.10 | | |
| $KUF_5$-6 | 30 | 1067 | 11.11 | | |

*Factory production test*

| Type of getter | No. of lamps | Percent air lamps | Percent gassy | Percent broken bulbs | Percent total shrinkage | Initial efficiency for designed life |
|---|---|---|---|---|---|---|
| 18-4 | 227,700 | .053 | .105 | .293 | 1.35 | 10.94 |
| E-343 | 263,449 | .007 | .069 | .228 | 1.09 | 11.17 |

The 18-4 getter means one containing ninety-six parts of sodium ferric fluoride and four parts of phosphorus. The $KUF_5$-6 getter contains ninety-four parts of $KUF_5$ and six parts of phosphorus. Likewise, the $KUF_5$-5 getter contains ninety-five parts of $KUF_5$ and five parts of phosphorus. The E-343 getter was made by mixing forty-eight grams of $KUF_5$, ninety-eight grams of $BaF_2$, twenty-one grams $CaF_2$, twenty-one grams $MgF_2$, and twelve grams of phosphorus.

The reason for adding $BaF_2$, $CaF_2$, and $MgF_2$ instead of cryolite, for example, to $KUF_5$, is that the three salts first mentioned are non-hygroscopic and will not affect the tungsten even if fused on an incandescent filament. The specified proportions were chosen because such a eutectic mixture gives the lowest vaporization point which is approximately 800° centigrade. If only $BaF_2$ were employed, it would not vaporize until the temperature above 1200° C. was reached, which would make flashing too slow. Cryolite will attack and etch tungsten, if any free aluminum is produced, and is somewhat hygroscopic, although not as much as sodium ferric fluoride.

Although preferred embodiments of my invention have been disclosed, it will be understood that modifications may be made within the spirit and scope of the appended claims.

I claim:
1. A maintenance getter comprising potassium uranium fluoride.
2. A getter comprising potassium uranium fluoride and phosphorus.
3. A maintenance getter comprising potassium uranium fluoride and a mixture of fluorides of group 2 metals.
4. A getter comprising potassium uranium fluoride, a mixture of fluorides of group 2 metals, and phosphorus.
5. A getter comprising potassium uranium fluoride, and a mixture of fluorides of barium, calcium, and magnesium.
6. A getter comprising potassium-uranium fluoride, a mixture of the fluorides of barium, calcium, and magnesium, and phosphorus.
7. A maintenance getter comprising a double fluoride of uranium and an alkali or alkaline earth metal.
8. A getter comprising a double fluoride of calcium and an element of the group including uranium and thorium.
9. A maintenance getter comprising a double fluoride of a metal of the alkali or alkaline earth group, and an element of the group comprising uranium and thorium.
10. A getter comprising forty-eight parts of potassium uranium fluoride, ninety-eight parts of barium fluoride, twenty-one parts of calcium fluoride, and twenty-one parts of magnesium fluoride.
11. A getter comprising forty-eight parts of potassium uranium fluoride, ninety-eight parts of barium fluoride, twenty-one parts of calcium fluoride, twenty-one parts of magnesium fluoride, and phosphorus.
12. A getter comprising potassium uranium fluoride mixed with other fluorides which will promote flashing from the carrying filament.
13. A getter comprising potassium uranium fluoride mixed with other fluorides which will promote flashing from the carrying filament, and phosphorus.
14. A getter comprising about nineteen parts of potassium uranium fluoride and one part of phosphorus.
15. A getter comprising about forty-seven parts of potassium uranium fluoride and three parts of phosphorus.
16. A filament coated with potassium uranium fluoride.
17. A filament coated with a mixture of potassium uranium fluoride and phosphorus.
18. A filament coated with a mixture of potassium uranium fluoride, and fluorides of barium, calcium and magnesium.
19. A filament coated with a mixture of potassium uranium fluoride, barium fluoride, calcium fluoride, magnesium fluoride, and phosphorus.

LLOYD D. LOCKWOOD.